(No Model.) 2 Sheets—Sheet 1.
W. H. HARRIS & W. H. RYER.
BUCKET FOR STORING AND BURNING TRASH.
No. 397,799. Patented Feb. 12, 1889.
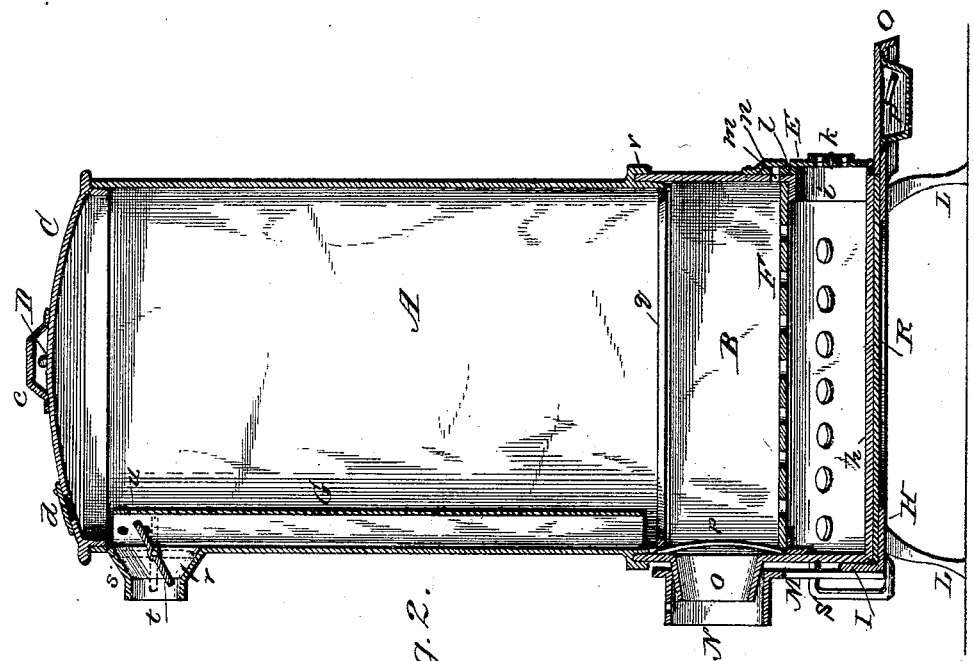
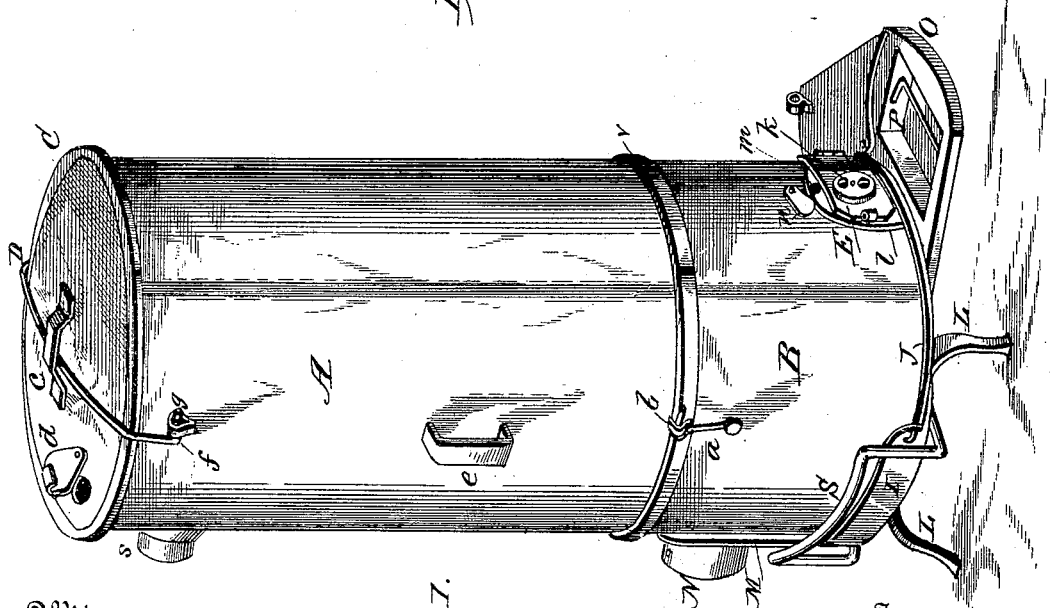
Witnesses.
Albert Spuden
E. L. Cummings.
Inventors
William H. Harris.
William H. Ryer.
By their Attorney
Chas. H. Fowler (No Model.) 2 Sheets—Sheet 2.
W. H. HARRIS & W. H. RYER.
BUCKET FOR STORING AND BURNING TRASH.
No. 397,799. Patented Feb. 12, 1889.
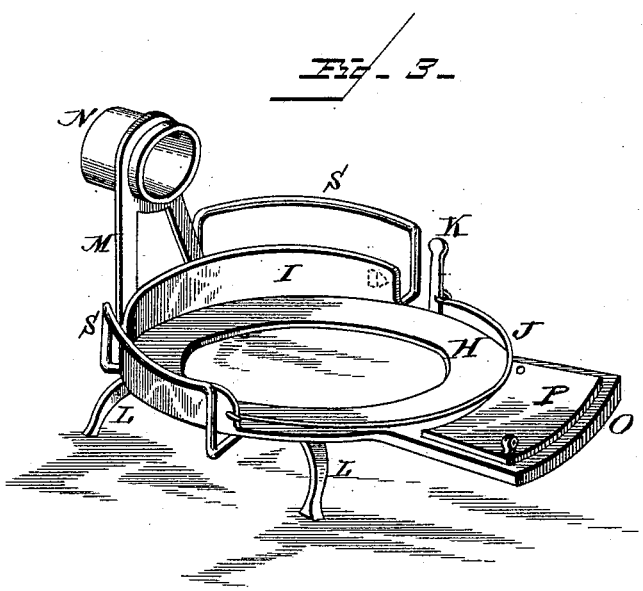
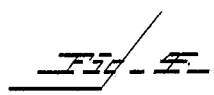
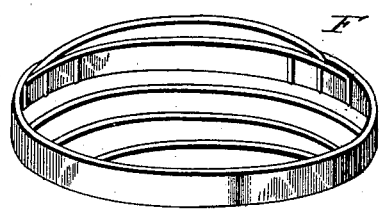
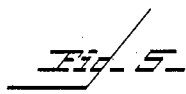
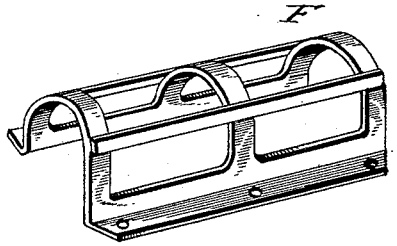
Witnesses,
Albert Spuden
E. L. Cummings
Inventor
William H. Harris
William H. Ryer
By their Attorney
Chas. H. Fowler

UNITED STATES PATENT OFFICE.

WILLIAM H. HARRIS AND WILLIAM H. RYER, OF STEELE CITY, NEBRASKA.

BUCKET FOR STORING AND BURNING TRASH.

SPECIFICATION forming part of Letters Patent No. 397,799, dated February 12, 1889.

Application filed April 19, 1888. Serial No. 271,162. (No model.)

*To all whom it may concern:*

Be it known that we, WILLIAM H. HARRIS and WILLIAM H. RYER, citizens of the United States, residing at Steele City, in the county of Jefferson and State of Nebraska, have invented certain new and useful Improvements in Buckets for Storing and Burning Trash; and we do hereby declare that the following is a full, clear, and exact description of the same, reference being had to the annexed drawings, making a part of this specification, and to the letters and figures of reference marked thereon.

Figure 1 of the drawings is a perspective view of our improved bucket for storing and burning trash; Fig. 2, a vertical section thereof; Fig. 3, a perspective view of the base for supporting the bucket; Fig. 4, a detail view in perspective of one form of grate to be placed in the bottom of the bucket, and Fig. 5 a similar view of a modification thereof.

The present invention has relation to that class of devices especially adapted for storing and burning any and all kinds of combustible material—such as weeds, leaves, barnyard and stack litter, &c.—commonly termed "trash."

The object of the invention is to improve the construction of this class of devices which are usually designated as "buckets," whereby the bucket can be utilized by connecting it, by means of pipes, with a suitable stove for heating, cooking, baking, and other purposes, thus making it a convenient attachment to specially-constructed stoves or those in ordinary use.

A further object of the invention is to improve the bucket in the several details of construction, whereby its value is greatly enhanced and the combustible material placed therein is more thoroughly and quickly consumed.

The several objects above enumerated we attain by the construction substantially as shown in the drawings, and hereinafter described and claimed.

In the accompanying drawings the bucket is represented as being composed of two sections, A B, detachably connected together by hooks $a$ on the lower section engaging with eyes $b$ on the upper section, or any other well-known form of fastening devices may be used, so long as they will securely fasten the bucket-sections together and admit of their being detached from each other when circumstances require. This bucket may be made of any desired capacity, of either sheet or cast metal, or the bottom section can be made of cast metal and the top section of sheet metal. The bucket is slightly tapering, being larger at its base than at its top, and the two sections being detachable, as hereinbefore described, the lower one can be used without the upper section by removing the latter and placing a suitable cover over the top of the lower section. The section A of the bucket is provided with a suitable cover, C, having handle $c$ and register $d$, of any suitable and well-known form, for the purpose hereinafter described, and the bucket is provided with handles $e$ for lifting it off the section B, or when it is desired to detach the section for the purpose of filling it with the material to be consumed. A bail, D, preferably formed of wire, is provided, having hooked ends $f$, which engage with eyes $g$ on the section A, whereby the cover is securely held in place when the section is inverted to be filled and carried with its contents therein. This will enable the section to be carried by the handles $e$ bottom up and turned over and into the bottom section of the bucket, after which it may be securely fastened thereto.

The bucket-section B is provided with a bottom, $h$, and at its front has an opening, $i$, closed by a tight-fitting door, E, which is provided with a suitable register, $k$, for regulating the draft.

When the section B is constructed of sheet metal, a cast-metal frame, $l$, is secured to it around the opening $i$, so as to give strength to the section around the opening.

The hinged door E is preferably detached from the bucket-section B, so as to facilitate dumping the ashes, or for other purposes. Upon the bottom $h$ rests a suitable grate, F, of any preferred construction; but the one shown in Fig. 2 of the drawings is concavo-convex in form and registers with the opening $i$, and is constructed of perforated sheet metal.

It is desirable that different kinds of grates be used, and constructed so as to be especially adapted to different kinds of trash. For instance, when sawdust, chaff, or leaves are to be consumed, this perforated grate is used; when coarser material, the slat-grate is employed, as shown in Fig. 5, and in cases where mica is inserted in the lower bucket-section it is preferred that the basket-grate, as shown in Fig. 4, be used to protect it from the burning material and prevent the material from coming in contact with it.

Through the bucket-section B, immediately over the opening $i$, is a hole, $m$, closed by a plate, $n$, to admit of a poker being inserted through the hole to rake the fire. Diametrically opposite the opening $i$, and above the grate F, is an opening surrounded by a tapering collar, $o$, through which the fire and smoke can pass out, and, when desired, connections being made therewith between the bucket and stove of any of the usual forms. This opening is prevented from filling with trash by means of wire guards, $p$, so that the passage of the fire and smoke will not be obstructed.

The bucket-section A at its lower edge and upon its interior has a hoop, $q$, secured thereto in any suitable manner, thereby when the section A is removed to be filled and the material packed quite firm the hoop will give sufficient resistance to hold the trash from falling out, and the hoop also forms a brace to keep the lower edge of the bucket-section in shape.

The section A at or near its top has an opening, $r$, which is surrounded by a collar, $s$, which opening is closed by a suitable damper, $t$, said damper also closing the passage in the vertical tube G, located within the bucket-section and connected thereto in any well-known manner, the upper portion of the tube being perforated, as shown at $u$.

By means of the collar $s$ and opening $r$ above described the bucket can be connected to a flue of good draft and the bucket used as a means of heating, or may be connected with a stove to draw the smoke down that may rise above the trash. When the damper $t$ is turned so as to form a passage between the opening $r$ and the flue, the damper will close the upper end of the tube G to prevent the smoke and fire from passing through.

The object in using a stove by forming a connection between it and the bucket is to utilize the heat generated in the bucket by the burning trash, which may be employed for cooking or for other purposes.

The lower edge of the bucket-section A has an overlapping flange, $v$, which fits over the upper edge of the section B, thereby making a smoke-tight joint between the two sections.

The tapering form of the bucket or the flare at the bottom will hold the trash down when it is firmly forced into the top, and as the trash is consumed at the bottom it will settle as fast as consumed, thereby making it self-feeding.

The base which supports the bucket is preferably of cast metal and consists of a skeleton plate, H, cast with a flange, I, extending upwardly and half-way around said plate to hold the bucket firmly on the plate when fastened by means of a wire bail, J. This bail at one end is hooked into the flange I and its opposite end similarly connected to a lever, K, which in turn is pivoted to the plate H, so that when the bucket is placed in position the bail will be brought tightly against the bucket by the lever to hold it in position, the lever when thus depressed being engaged with a suitable hook upon the flange, as shown in dotted lines, Fig. 3. On the under side of the skeleton plate are suitably connected the legs L to support it above the floor. The base is provided with a bracket, M, extending up a suitable distance to be on line with the collar $o$ of the bucket-section B and has short pipe-section N, of sufficient diameter to slip over the collar, as shown in Fig. 2, said pipe enabling a goose-neck pipe to be attached thereto to conduct away the smoke when the bucket is used as a heater, or to use with other attachments or with a common stove. The base is also cast with a support, O, at its front to receive a suitable ash-pan, P, and a pivoted lid is connected to the support to close over the ash-pan. Foot-rails S are attached to the sides of the base, and upon the skeleton plate rests a circular plate, R, which is removable therefrom. This plate forms a bottom to the skeleton plate and facilitates the sliding of the bucket thereon, and also keeps the fire from heating and burning under the base; or, if holes should burn through the bottom of the bucket, the circular plate would arrest the fire or embers from passing through the skeleton base onto the floor.

Having now fully described our invention, what we claim as new, and desire to secure by Letters Patent, is—

1. The combination, with a suitable bucket for storing and burning trash, of a base for supporting said bucket, consisting of the skeleton plate supported upon legs and provided with a pivoted bail and lever for fastening the bucket in position, substantially as and for the purpose specified.

2. The combination, with a bucket for storing and burning trash provided with an opening and collar, $o$, of the supporting-base consisting of the skeleton plate H, flange I, bracket M, and pipe-section N, substantially as and for the purpose described.

3. The combination, with the detachable bucket-sections A B, of the base for supporting the bucket, consisting of the skeleton plate H, supported upon legs, and the circular plate R, resting over the opening in the skeleton plate, and means for holding the bucket stationary on the base, substantially as and for the purpose set forth.

In testimony that we claim the above we have hereunto subscribed our names in the presence of two witnesses.

WILLIAM H. HARRIS.
WILLIAM H. RYER.

Witnesses:
H. H. KLINE,
E. C. CASE.